United States Patent
Takeguchi

(10) Patent No.: US 8,735,014 B2
(45) Date of Patent: May 27, 2014

(54) FUEL CELL AND FUEL CELL STACK INCLUDING THE SAME

(75) Inventor: Shinsuke Takeguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/583,810

(22) PCT Filed: Feb. 15, 2012

(86) PCT No.: PCT/JP2012/000997
§ 371 (c)(1),
(2), (4) Date: Sep. 10, 2012

(87) PCT Pub. No.: WO2012/114681
PCT Pub. Date: Aug. 30, 2012

(65) Prior Publication Data
US 2013/0004877 A1    Jan. 3, 2013

(30) Foreign Application Priority Data

Feb. 22, 2011    (JP) ................. 2011-035445

(51) Int. Cl.
*H01M 8/04* (2006.01)
*H01M 8/02* (2006.01)
*H01M 8/24* (2006.01)

(52) U.S. Cl.
CPC ............ *H01M 8/0267* (2013.01); *H01M 8/242* (2013.01); *H01M 8/04029* (2013.01)
USPC .............................. 429/437; 429/433; 429/434

(58) Field of Classification Search
CPC  H01M 8/0267; H01M 8/242; H01M 8/04029
USPC ........................................ 429/437, 433, 434
See application file for complete search history.

(56) References Cited

U.S. PATENT DOCUMENTS

2010/0196774 A1*  8/2010  Kawabata et al. ............ 429/437

FOREIGN PATENT DOCUMENTS

| JP | 2005-149919 A | 6/2005 |
| JP | 2007-042417 A | 2/2007 |
| JP | 2008-016272 A | 1/2008 |
| JP | 2010-113864 A | 5/2010 |

OTHER PUBLICATIONS

International Search Report mailed Apr. 10, 2012 issued in corresponding to PCT/JP2012/000997.

* cited by examiner

*Primary Examiner* — Nicholas P D'Aniello
(74) *Attorney, Agent, or Firm* — McDermott Will & Emery LLP

(57) ABSTRACT

A fuel cell of the present invention includes an electrolyte layer-electrode assembly (5), a first separator (4A), and a second separator (4C). A cooling water channel (8) is formed on a main surface of at least one of the first separator (4A) and the second separator (4C) so as to communicate with at least one of a first cooling water manifold hole (41) and a second cooling water manifold hole (51). A first channel forming portion (11) is located in at least one of the first cooling water manifold hole (41) and the second cooling water manifold hole (51) when viewed from a thickness direction of an electrolyte layer (1) and is provided so as to be opposed to at least a part of an end surface constituting the first cooling water manifold hole (41) and the second cooling water manifold hole (51).

14 Claims, 8 Drawing Sheets

FUEL CELL AND FUEL CELL STACK INCLUDING THE SAME

RELATED APPLICATIONS

This application is the U.S. National Phase under 35 U.S.C. §371 of International Application No. PCT/JP2012/000997, filed on Feb. 15, 2012, which in turn claims the benefit of Japanese Application No. 2011-035445, filed on Feb. 22, 2011, the disclosures of which Applications are incorporated by reference herein.

TECHNICAL FIELD

The present invention relates to a fuel cell and a fuel cell stack including the fuel cell, and particularly to the configuration of a fuel cell.

BACKGROUND ART

A fuel cell is a device including a MEA (Membrane-Electrode Assembly; electrolyte membrane-electrode assembly) and configured to generate electric power and heat in such a manner that: both main surfaces of the MEA are respectively exposed to a hydrogen-containing anode gas and an oxygen-containing cathode gas, such as air, to cause the anode gas and the cathode gas to electrochemically react with each other.

Generally, the fuel cell includes as a main body a stack configured by stacking unit cells. Each of the cells is configured such that the MEA is sandwiched between a pair of flat plate-shaped separators, specifically an anode separator and a cathode separator. The MEA is configured to include a polymer electrolyte membrane and a pair of electrodes respectively stacked on both surfaces of the polymer electrolyte membrane. Electrode surfaces are respectively formed on both main surfaces of the MEA. Each of the separators is made of an electrically conductive material, such as resin containing electrically conductive carbon or metal, and contacts the electrode surface of the MEA to serve as a part of an electric circuit.

Here, an electrochemical reaction in the cell is an exothermic reaction. Therefore, during an electric power generating operation of the fuel cell, the cells need to be cooled such that the temperature of an inner surface of each cell becomes a catalytic activity temperature, and the temperature of the inside of the fuel cell needs to be appropriately controlled. To be specific, if the cell is not adequately cooled, the temperature of the MEA increases, and moisture evaporates from the polymer electrolyte membrane. As a result, the durability of the cell stack decreases by the acceleration of deterioration of the polymer electrolyte membrane, and the electric output of the cell decreases by the increase in the electrical resistance of the polymer electrolyte membrane. In contrast, if the cell is cooled beyond necessity, the condensation of the moisture in a reactant gas flowing through a gas channel occurs, and the amount of water in liquid form in the reactant gas increases. The water in liquid form adheres as liquid droplets by surface tension to the gas channel of the separator plate. If the amount of liquid droplets is too large, the water adhering to the gas channel closes the gas channel and blocks the flow of the gas, and this causes flooding. As a result, the reactive area of the electrode decreases, and the performance of the fuel cell decreases, for example, the electric output becomes unstable.

Because of the above reasons, a cooling medium manifold through which a cooling medium flows is generally formed on the fuel cell stack so as to extend in a stack direction of the cells. In addition, cooling medium channels are formed among the stacked cells of the fuel cell stack so as to communicate with the cooling medium manifold. Moreover, a material with good heat conductivity is used as a material of the separator.

As the cooling medium flowing through the cooling medium manifold and the cooling medium channels, water is generally used. In a case where water, such as ion exchanged water, with low electric conductivity is used as the cooling medium, short-circuit occurs between positive and negative members in the fuel cell stack, specifically between the electrically conductive separators, via the cooling water filled in the cooling medium manifold. This is because such water is electrically conductive. As a result, a short-circuit current flows through the separator, and this causes the corrosion of a wall surface forming a cooling medium manifold hole formed on a positive separator.

Here, a fuel cell is known, in which to solve the problem of the corrosion of the separator, a projecting portion is formed on an inner side of a cross section, relative to the stack direction of the fuel cell, of each of a cooling liquid supply manifold and a cooling liquid discharge manifold (see PTL 1, for example).

CITATION LIST

Patent Literature

PTL 1: Japanese Laid-Open Patent Application Publication No. 2010-113864

SUMMARY OF INVENTION

Technical Problem

However, the present inventors have found that in order to further improve the durability of the fuel cell stack of the fuel cell disclosed in PTL 1, there is still room for improvement.

To be specific, the amount of current corroding the wall surface constituting the cooling water manifold hole of the separator is determined by the resistance of the cooling water in the manifold. Most of the cooling water flows through the cooling water manifold, whereas the flow rate of the cooling water decreases at a portion where the manifold branches to the cooling water channel of each separator. To be specific, the present inventors have found that the resistance of the cooling water can be more effectively increased by not only reducing the cross-sectional area of the cooling water manifold as described in PTL 1 but also increasing the distance between the fuel cells which cause the short-circuit.

The present invention was made to solve the above problems, and an object of the present invention is to provide a fuel cell capable of suppressing the corrosion of the wall surface constituting the cooling water manifold hole of the separator and a fuel cell stack including the fuel cell.

Solution to Problem

To solve the above problems, a fuel cell according to the present invention includes: an electrolyte layer-electrode assembly including an electrolyte layer and a pair of electrodes respectively provided on main surfaces of the electrolyte layer; a frame provided so as to sandwich a peripheral portion of the electrolyte layer; a first separator having electrical conductivity, formed in a plate shape, and provided with a first cooling water manifold hole penetrating the first separator in a thickness direction of the first separator; and a second separator having electrical conductivity, formed in a plate shape, and provided with a second cooling water manifold hole penetrating the second separator in a thickness direction of the second separator, wherein: the electrolyte layer-electrode assembly and the frame are sandwiched between the first separator and the second separator; the frame is provided with a third cooling water manifold hole penetrating the frame in a thickness direction of the frame and communicating with the first cooling water manifold hole and the second cooling water manifold hole; a cooling water channel is formed on a main surface of at least one of the first separator and the second separator so as to communicate with at least one of the first cooling water manifold hole and the second cooling water manifold hole; and a first channel forming portion is located in at least one of the first cooling water manifold hole and the second cooling water manifold hole when viewed from a thickness direction of the electrolyte layer and is provided so as to be opposed to at least a part of an end surface constituting the first cooling water manifold hole or the second cooling water manifold hole.

Advantageous Effects of Invention

The fuel cell of the present invention and the fuel cell stack including the fuel cell can suppress the corrosion of the wall surface of the cooling water manifold hole of the separator, the corrosion being caused via the cooling water.

DESCRIPTION OF EMBODIMENTS

Figure 1:
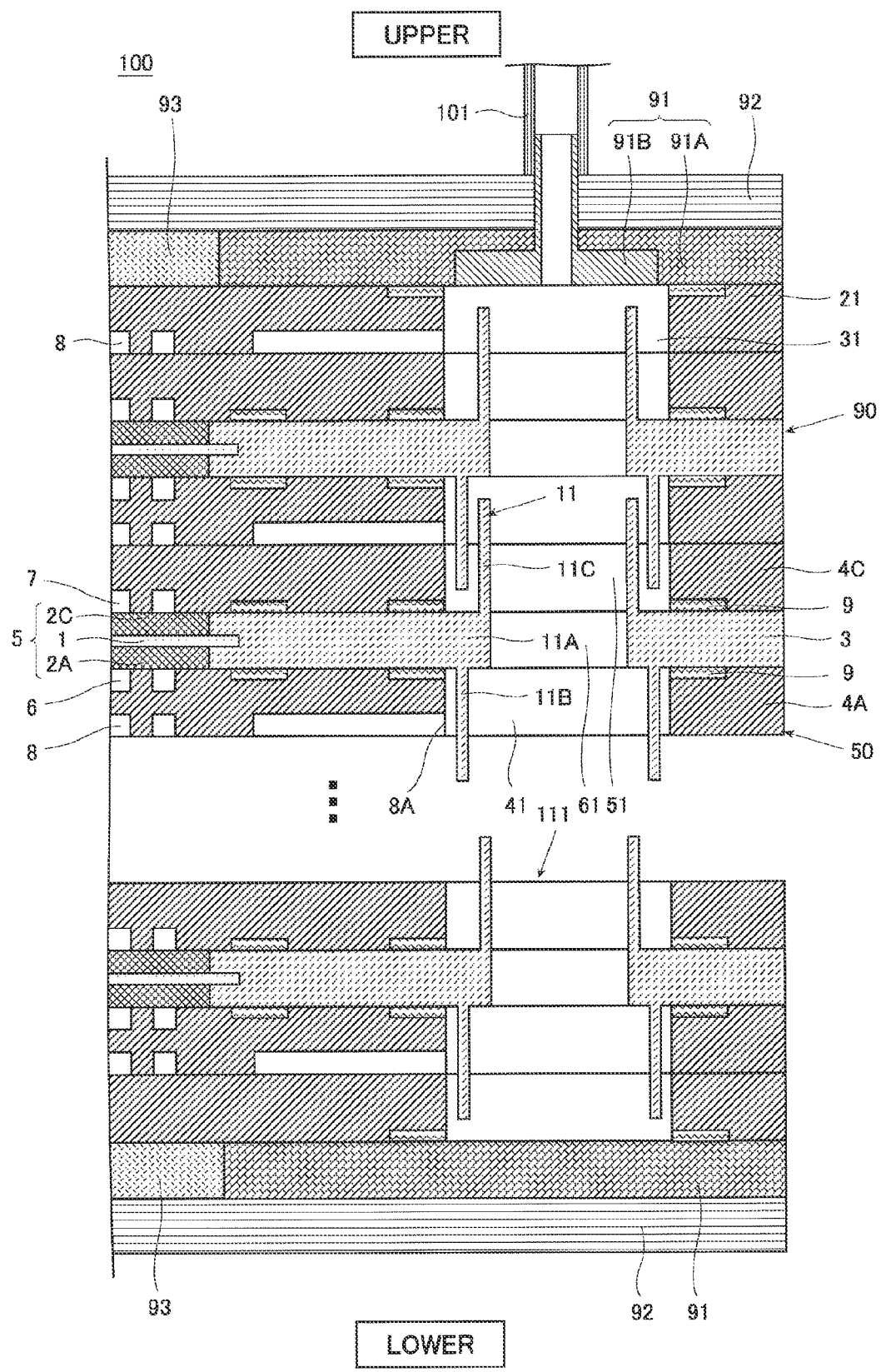
FIG. 1 is a cross-sectional view schematically showing the schematic configuration of a fuel cell stack according to Embodiment 1 of the present invention.

Hereinafter, preferred embodiments of the present invention will be explained in reference to the drawings. In the drawings, the same reference signs are used for the same or corresponding components, and a repetition of the same explanation is avoided. Moreover, in the drawings, only components necessary to explain the present invention are shown, and the other components are omitted. Further, the present invention is not limited to embodiments below.

Embodiment 1

A fuel cell according to Embodiment 1 of the present invention includes: an electrolyte layer-electrode assembly having an electrolyte layer, a frame, and a pair of electrodes; a first separator; and a second separator, and when viewed from a thickness direction of the electrolyte layer, a first channel forming portion is formed in at least one of a first cooling water manifold hole and a second cooling water manifold hole so as to be opposed to at least a part of an end surface constituting the first cooling water manifold hole and the second cooling water manifold hole.

Configuration of Fuel Cell Stack

FIG. 1 is a cross-sectional view schematically showing the schematic configuration of a fuel cell stack according to Embodiment 1 of the present invention. In FIG. 1, a part of the fuel cell stack is omitted, and an upper-lower direction of the fuel cell stack is shown as an upper-lower direction of the drawing.

As shown in FIG. 1, a fuel cell stack 100 according to Embodiment 1 includes: a cell stack body 90 formed by stacking a plurality of fuel cells 50; and a pair of insulating members 91. A plate-shaped, electrically conductive end separator 21 is provided on at least one of both ends of the cell stack body 90 (in FIG. 1, on each of both ends of the cell stack body 90). The end separator 21 is provided with a cooling water supply manifold hole 31 through which cooling water flows. A cooling water channel 8 is formed on one main surface of the end separator 21 so as to communicate with the cooling water supply manifold hole 31, the main surface contacting the cell stack body 90.

A pair of insulating members 91 are provided so as to sandwich the end separators 21 and the cell stack body 90. Each of the insulating members 91 includes a peripheral member 91A and a connecting member 91B and is made of, for example, an insulating material, such as polypropylene (PP), polyphenylene sulfide (PPS), polyethylene terephthalate (PET), or polytetrafluoroethylene (PTFE). The peripheral member 91A is formed in a plate shape. When viewed from a stack direction of the fuel cells 50, the peripheral member 91A is formed in a ring shape. A current collector 93 is provided on an inner side of the peripheral member 91A when viewed from the stack direction of the fuel cells 50. The connecting member 91B is configured such that a pipe 101 constituting a cooling water supply passage through which the cooling water is supplied to the fuel cell stack 100 (or constituting a cooling water discharging passage through which the cooling water is discharged from the fuel cell stack 100) is connected to the fuel cell stack 100.

An end plate 92 is provided on a stack-direction outer side of the insulating member 91 so as to contact the insulating member 91. The end plates 92, the insulating members 91, the current collectors 93, the end separators 21, and the cell stack body 90 are fastened to one another with fastening members, not shown. Below-described cooling water supply manifold holes (first cooling water manifold holes) 41, below-described cooling water supply manifold holes (second cooling water manifold holes) 51, and below-described cooling water supply manifold holes (third cooling water manifold holes) 61 are connected to one another in the stack direction of the fuel cells 50 to form a cooling water manifold 111. Embodiment 1 describes a case where an insulating material, such as resin, is used as a material of the end plate 92. In a case where an electrically conductive material, such as a metal material, is used as a material of the end plate 92, an insulating plate needs to be inserted between the end plate 92 and the current collector 93.

Configuration of Fuel Cell

The fuel cell 50 includes: a MEA (Membrane-Electrode Assembly; electrolyte layer-electrode assembly) 5 having a polymer electrolyte membrane (electrolyte layer) 1 and a pair of electrodes 2A and 2C; a frame 3; a first separator 4A; and a second separator 4C.

The polymer electrolyte membrane 1 is formed in a substantially quadrangular shape (herein, a rectangular shape). As with the polymer electrolyte membrane 1, the frame 3 is formed in a substantially quadrangular shape (herein, a rectangular shape). An opening 3A is formed on a main surface of the frame 3. When viewed from the stack direction of the fuel cells 50 (when viewed from a thickness direction of the polymer electrolyte membrane 1), the frame 3 is formed in a ring shape (see FIG. 3). The frame 3 is provided so as to sandwich a peripheral portion of the polymer electrolyte membrane 1. Respective manifold holes, such as the cooling water supply manifold hole (third cooling water manifold hole) 61, are formed on the main surface of the frame 3 (see FIG. 3).

It is preferable that the frame 3 be made of an insulating material, such as polypropylene (PP), polyphenylene sulfide resin (PPS), or liquid crystal polymer (LCP). The frame 3 can be formed by, for example, injection molding. A first channel forming portion 11 is formed on the frame 3, and details will be described below.

A pair of electrodes 2A and 2C are respectively provided on both surfaces of the polymer electrolyte membrane 1 so as to be located on an inner side of the peripheral portion of the polymer electrolyte membrane 1. Each of the electrodes 2A and 2C includes a catalyst layer and a gas diffusion layer provided on the catalyst layer (both layers are not shown). The catalyst layer is configured to contain: catalyst supporting carbon made of carbon powder (electrically conductive carbon particles) supporting platinum-based metal catalysts (electrode catalysts); and a polymer electrolyte adhering to the catalyst supporting carbon. The gas diffusion layer has gas permeability and electrical conductivity. A material constituting the gas diffusion layer is not especially limited, and materials known in this field may be used. For example, an electrically conductive porous base material, such as carbon cloth or carbon paper, may be used. The electrically conductive porous base material may be subjected to water repellent finish in accordance with a conventionally known method.

A pair of gaskets 9 are respectively provided on both surfaces of the frame 3. Each of the gaskets 9 is constituted by: a portion surrounding the electrode 2A or the electrode 2C; portions surrounding respective manifold holes, such as the cooling water supply manifold hole 41 formed on the below-described first separator 4A or the cooling water supply manifold hole 51 formed on the below-described second separator 4C; and a portion connecting the above portions. With this, a fuel gas and an oxidizing gas are prevented from leaking to the outside of the cell and are prevented from being mixed with each other in the fuel cell 50. The gasket 9 may be formed in any shape as long as the fuel gas and the oxidizing gas are prevented from leaking to the outside of the cell and are prevented from being mixed with each other in the fuel cell 50.

The first separator 4A and the second separator 4C are provided so as to sandwich the MEA 5, the frame 3, and the gaskets 9. With this, the MEA 5 is mechanically fixed, and when a plurality of fuel cells 50 are stacked in a thickness direction of the fuel cell 50, the MEAs 5 are electrically connected to one another. Each of the separators 4A and 4C may be a resin-impregnated graphite plate formed by impregnating a graphite plate with phenol resin and hardening the plate or a plate made of a metal material, such as SUS.

A groove-like first reactant gas channel 6 through which a reactant gas flows is formed on one main surface (hereinafter referred to as an "inner surface") of the first separator 4A, the inner surface contacting the electrode 2A. The groove-like cooling water channel 8 through which the cooling water flows is formed on the other main surface (hereinafter referred to as an "outer surface") of the first separator 4A. A groove-like second reactant gas channel 7 through which the reactant gas flows is formed on one main surface (hereinafter referred to as an "inner surface") of the second separator 4C, the inner surface contacting the electrode 2C. Each of the first reactant gas channel 6 and second reactant gas channel 7 may be formed in any shape. For example, each of the first reactant gas channel 6 and second reactant gas channel 7 may be formed in a serpentine shape, a straight shape, or a spiral shape.

Here, the configuration of the first separator 4A will be explained in more detail in reference to FIG. 2. Since the second separator 4C is configured in the same manner as the first separator 4A, a detailed explanation thereof is omitted.

Figure 2:
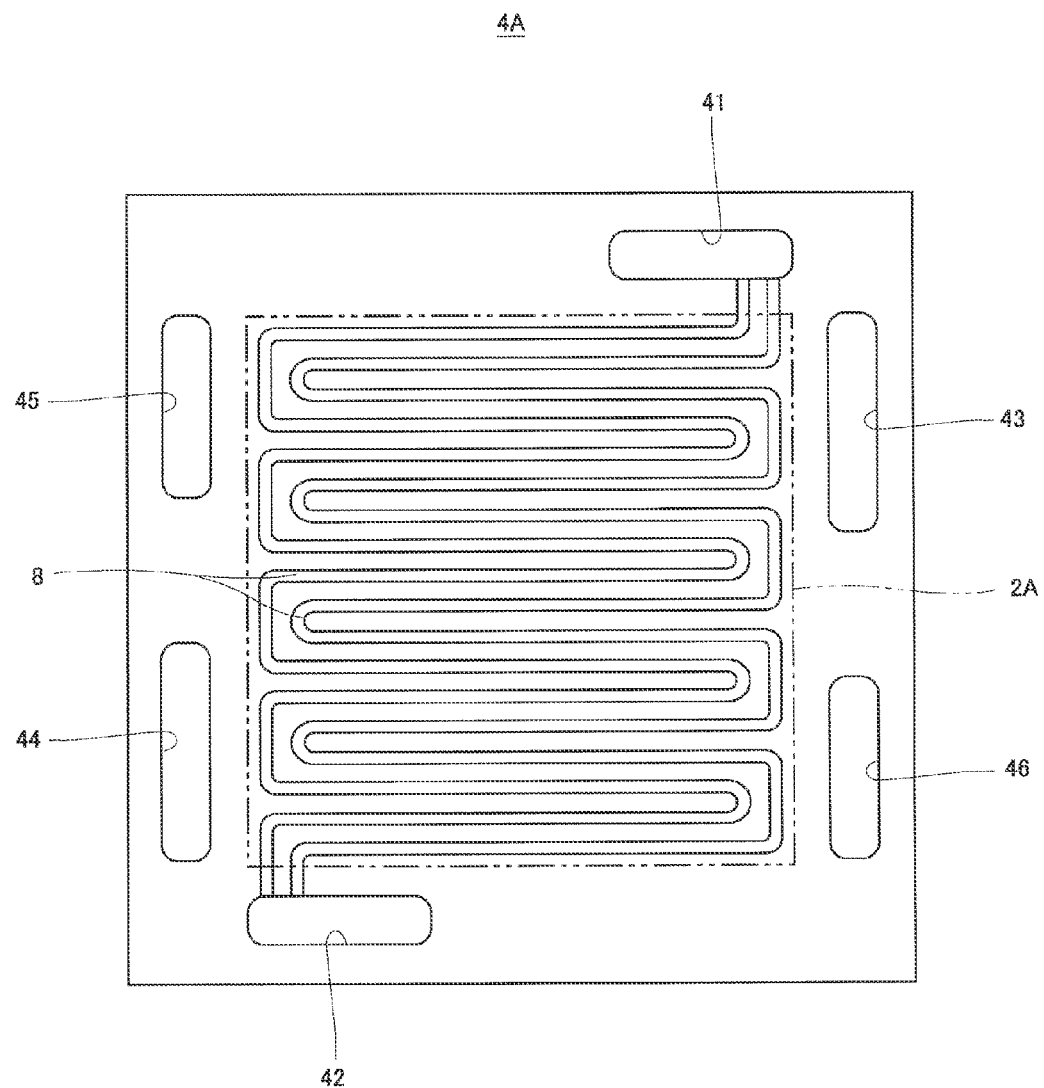
FIG. 2 is a schematic diagram showing the schematic configuration of a first separator of the fuel cell shown in FIG. 1.

FIG. 2 is a schematic diagram showing the schematic configuration of the first separator of the fuel cell shown in FIG. 1. FIG. 2 shows the outer surface of the first separator.

As shown in FIG. 2, the first separator 4A is formed in a substantially quadrangular shape (herein, a rectangular shape). The cooling water supply manifold hole (first cooling water manifold hole) 41, a cooling water discharge manifold hole (first cooling water manifold hole) 42, a first reactant gas supply manifold hole 43, a first reactant gas discharge manifold hole 44, a second reactant gas supply manifold hole 45, and a second reactant gas discharge manifold hole 46 are formed on a peripheral portion of the outer surface of the first separator 4A so as to penetrate the first separator 4A in a thickness direction of the first separator 4A.

The cooling water channel 8 is formed on the outer surface of the first separator 4A so as to cause the cooling water supply manifold hole 41 and the cooling water discharge manifold hole 42 to communicate with each other. Herein, the cooling water channel 8 is formed in a serpentine shape, but the present embodiment is not limited to this. For example, the cooling water channel 8 may be formed in a straight shape or a spiral shape.

With this, the reactant gases are respectively supplied to the electrode 2A and the electrode 2C and react with each other to generate electricity and heat. In addition, the cooling water is caused to flow through the cooling water channel 8 to recover the generated heat. The fuel cell 50 configured as above may be used as a unit cell (cell), or a plurality of stacked fuel cells 50 may be used as the fuel cell stack 100.

Configuration of First Channel Forming Portion

Next, the configuration of a channel forming portion will be explained in detail in reference to FIGS. 1 and 3.

Figure 3:
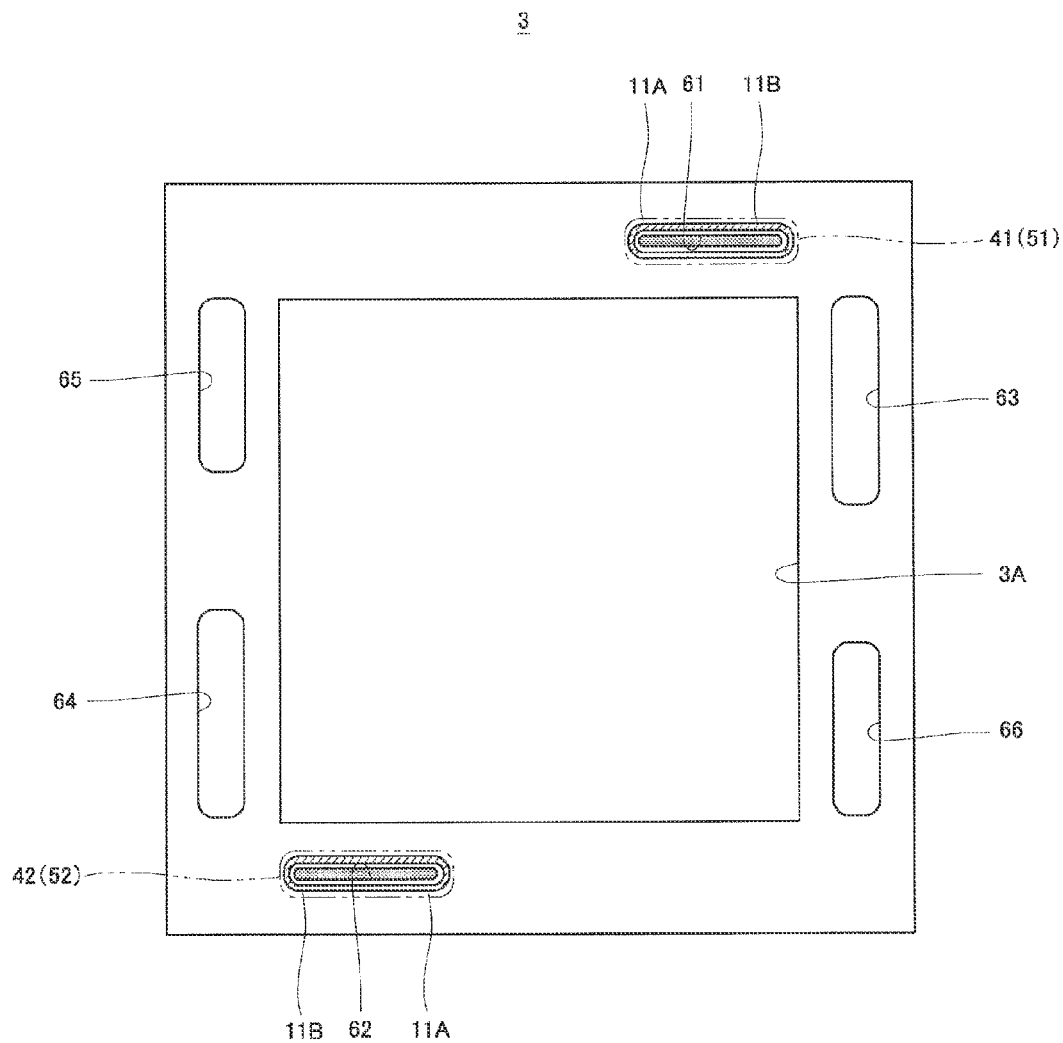
FIG. 3 is a schematic diagram showing the schematic configuration of a frame of the fuel cell shown in FIG. 1.

FIG. 3 is a schematic diagram showing the schematic configuration of the frame of the fuel cell shown FIG. 1. In FIG. 3, the cooling water manifold hole and a second convex portion are shown by hatching.

As shown in FIG. 3, the cooling water supply manifold hole 61, a cooling water discharge manifold hole (third cooling water manifold hole) 62, a first reactant gas supply manifold hole 63, a first reactant gas discharge manifold hole 64, a second reactant gas supply manifold hole 65, and a second reactant gas discharge manifold hole 66 are formed on a main surface of the frame 3 so as to penetrate the frame 3 in a thickness direction of the frame 3.

As shown in FIGS. 1 and 3, the cooling water supply manifold hole 61 is formed such that when viewed from the thickness direction of the frame 3, an opening thereof is smaller than each of an opening of the cooling water supply manifold hole 41 formed on the first separator 4A and an opening of the cooling water supply manifold hole 51 formed on the second separator 4C. Similarly, the cooling water discharge manifold hole 62 is formed such that when viewed from the thickness direction of the frame 3 (thickness direction of the polymer electrolyte membrane 1), an opening thereof is smaller than each of an opening of the cooling water discharge manifold hole 42 formed on the first separator 4A and an opening of a cooling water discharge manifold hole 52 formed on the second separator 4C.

Herein, a portion of the frame 3, the portion projecting on the inner side of the cooling water supply manifold hole 41 (cooling water supply manifold hole 51) when viewed from the thickness direction of the frame 3, is a projecting portion 11A. Similarly, a portion of the frame 3, the portion projecting on the inner side of the cooling water discharge manifold hole 42 (cooling water discharge manifold hole 52) when viewed from the thickness direction of the frame 3, is the projecting portion 11A (not shown in FIG. 1).

A first convex portion 11B extending in the thickness direction of the frame 3 toward the first separator 4A is formed on the projecting portion 11A, and a second convex portion 11C extending in the thickness direction of the frame 3 toward the second separator 4C is formed on the projecting portion 11A (the portions 11B and 11C are not shown in FIG. 3). In Embodiment 1, the first convex portion 11B and the second convex portion 11C constitute the first channel forming portion 11.

It is preferable that the first convex portion 11B be formed so as to be opposed to an entrance 8A of the cooling water channel 8 when viewed from a direction perpendicular to the thickness direction of the frame 3. Herein, the wording "direction perpendicular to the thickness direction of the frame 3" is a direction in which the cooling water channel 8 extends from the entrance 8A, and is a horizontal direction in FIG. 1 and the upper-lower direction in FIG. 3. Moreover, the wording "so as to be opposed to an entrance 8A of the cooling water channel 8" denotes that the first convex portion 11B is formed so as to face the entrance 8A of the cooling water channel 8. With this, the cooling water flows from the cooling water manifold 111 along the first convex portion 11B to be supplied to the entrance 8A of the cooling water channel 8. Therefore, height-direction corrosion of the end surface (wall surface) constituting the cooling water supply manifold hole 41 (cooling water supply manifold hole 51) can be further suppressed.

To further suppress circumferential-direction corrosion of the end surface (wall surface) constituting the cooling water supply manifold hole 41 (cooling water supply manifold hole 51), it is preferable that the first convex portion 11B be formed in a ring shape when viewed from the thickness direction of the frame 3. Similarly, to further suppress the circumferential-direction corrosion of the end surface (wall surface) constituting the cooling water discharge manifold hole 42 (cooling water discharge manifold hole 52), it is preferable that the first convex portion 11B be formed in a ring shape when viewed from the thickness direction of the frame 3.

To further suppress the circumferential-direction corrosion of the end surface (wall surface) constituting the cooling water supply manifold hole 41 (cooling water supply manifold hole 51), it is preferable that the second convex portion 11C be formed in a ring shape when viewed from the thickness direction of the frame 3. Similarly, to further suppress the circumferential-direction corrosion of the end surface (wall surface) constituting the cooling water discharge manifold hole 42 (cooling water discharge manifold hole 52), it is preferable that the second convex portion 11C be formed in a ring shape when viewed from the thickness direction of the frame 3.

It is preferable that the first convex portion 11B and the second convex portion 11C be formed so as not to overlap each other when viewed from the direction perpendicular to the thickness direction of the frame 3. With this, when viewed from the thickness direction of the polymer electrolyte membrane 1, the cooling water located at a center portion of the cooling water manifold 111 flows along the first convex portion 11B and the second convex portion 11C to reach the end surface (wall surface) constituting the cooling water supply manifold hole 41 (cooling water supply manifold hole 51). On this account, the corrosion of the end surface (wall surface) constituting the cooling water supply manifold hole 41 (cooling water supply manifold hole 51) can be further suppressed.

Similarly, when viewed from the thickness direction of the polymer electrolyte membrane 1, the cooling water located at the center portion of the cooling water manifold 111 flows along the first convex portion 11B and the second convex portion 11C to reach the end surface (wall surface) constituting the cooling water discharge manifold hole 42 (cooling water discharge manifold hole 52). On this account, the corrosion of the end surface (wall surface) constituting the cooling water discharge manifold hole 42 (cooling water discharge manifold hole 52) can be further suppressed.

Further, it is preferable that when viewed from the direction perpendicular to the thickness direction of the frame 3, an extending-direction length of at least one of the first convex portion 11B and the second convex portion 11C (in Embodiment 1, each of both the first convex portion 11B and the second convex portion 11C) be longer than a thickness-direction length of at least one of the first separator 4A and the second separator 4C and shorter than the sum of thickness-direction lengths of the first separator 4A and the second separator 4C. With this, the height-direction corrosion of the end surface (wall surface) constituting the cooling water supply manifold hole 41 (cooling water supply manifold hole 51) or the cooling water discharge manifold hole 42 (cooling water discharge manifold hole 52) can be further suppressed.

Operational Advantages of Fuel Cell Stack

Next, the operational advantages of the fuel cell stack 100 (fuel cell 50) according to Embodiment 1 will be explained in reference to FIGS. 1 to 3.

When the fuel cell stack is operated in a fuel cell system, the cooling water filled in the cooling water manifold has the electric conductivity of several µS/cm to several tens of µS/cm. Even in the case of the cooling water with such low electric conductivity, by performing the electric power generating operation of the fuel cell system, a short-circuit current flows through the wall surface forming the cooling water manifold (hole) of the separator provided on the positive side. Most of the short-circuit current is used as energy for the electrolysis of the cooling water, but a part of the short-circuit current is used as energy (corrosion current) when corroding the carbon or metal constituting the separator.

For example, in the separator constituted by a graphite plate, carbon reacts with oxygen atoms of water to become carbon dioxide, and the wall surface forming the cooling water manifold hole is corroded. Moreover, in the separator made of metal, such as SUS, the wall surface forming the cooling water manifold hole is corroded by the elution of metal ions, such as iron. Especially in the separator made of metal, such as SUS, the electric conductivity of the cooling water is increased by the elution of the metal ions, such as iron, and this accelerates the corrosion of the separator.

As a result, the problem is that the wall surface forming the cooling water manifold (hole) is corroded, this causes the breakage of a seal line for providing the gasket, and the continuous electric power generation by the fuel cell stack becomes difficult.

Here, the resistance of the cooling water is determined by Formula 1. In Formula 1, R (Ω) denotes the resistance of the cooling water between electric conductors which short-circuit, L (cm) denotes a distance between the electric conductors which short-circuit, ρ ($Ω^{-1}·cm^{-1}$) denotes resistivity, and S ($cm^2$) denotes a cross-sectional area of a passage in which the cooling water short-circuits.

$$R = \frac{L}{\rho \cdot S} \quad \text{Formula 1}$$

In the case of stacking a plurality of fuel cells 50 as shown in FIG. 1, a plurality of short-circuit paths are formed among the plurality of fuel cells 50. In a case where the short-circuit paths are complexly formed as above, the sum of resistances R of respective sections is calculated as a total resistance Rt. Here, the total resistance Rt will be explained in reference to FIGS. 4 and 5.

Figure 4:
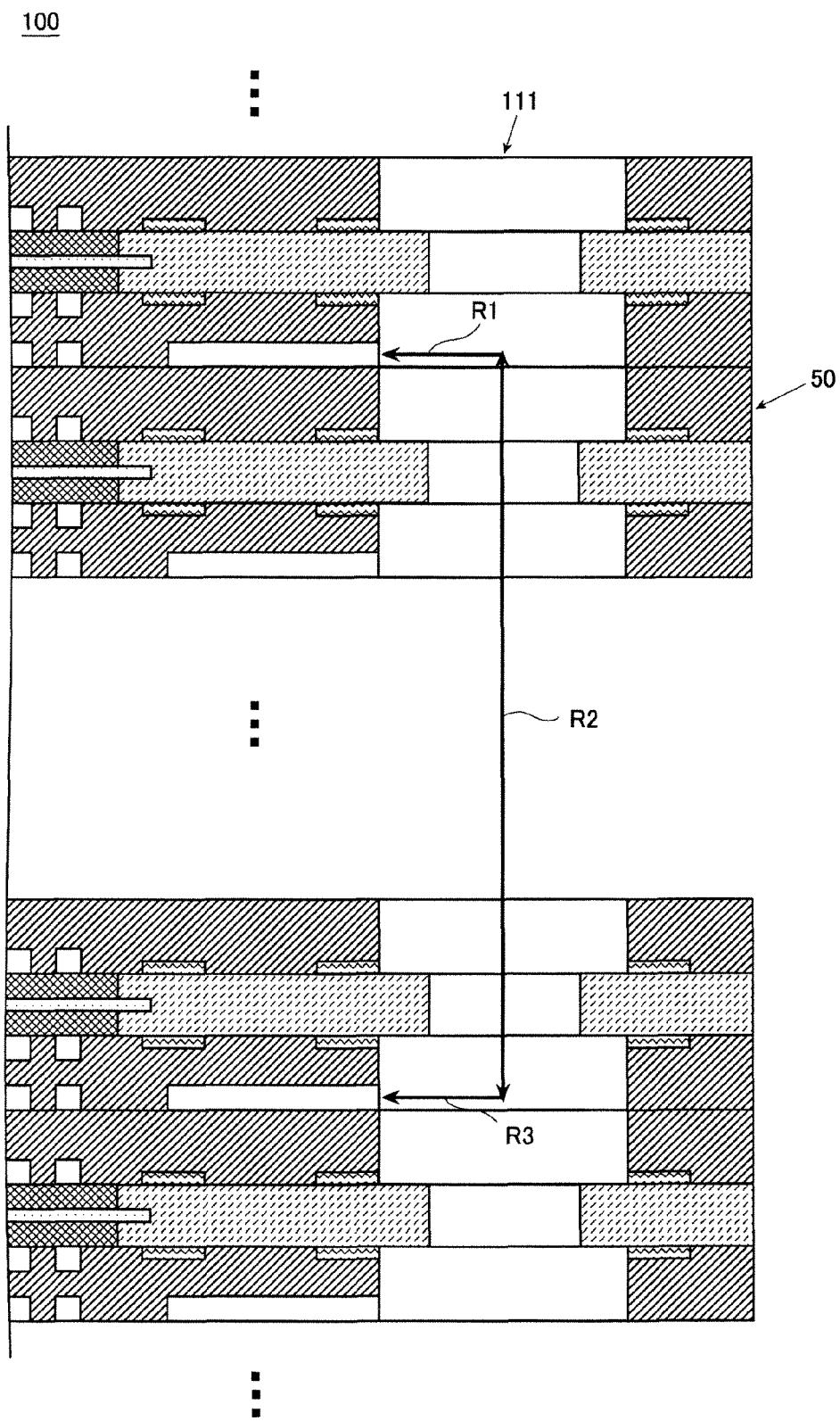
FIG. 4 is a schematic diagram showing one example of a short-circuit path generated between two fuel cells.
Figure 5:
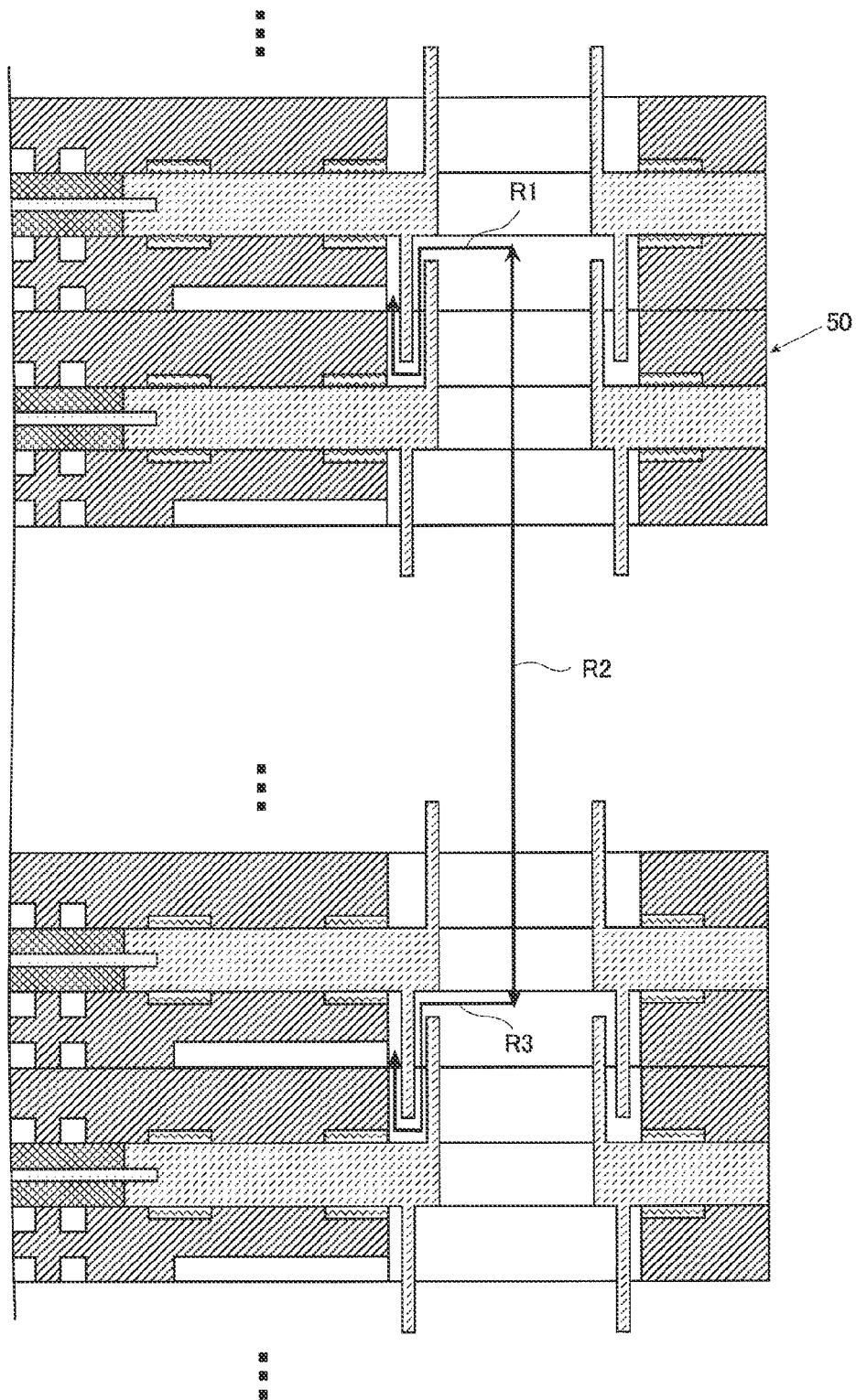
FIG. 5 is a schematic diagram showing one example of the short-circuit path generated between two fuel cells.

Each of FIGS. 4 and 5 is a schematic diagram showing one example of the short-circuit path generated between two fuel cells. FIG. 4 is a schematic diagram in a case where the fuel cells described in PTL 1 are adopted, and FIG. 5 is a schematic diagram in a case where the fuel cells according to Embodiment 1 are adopted. In FIGS. 4 and 5, reference signs, such as the polymer electrolyte membrane 1, are omitted.

As shown in FIGS. 4 and 5, the total resistance Rt is calculated by Formula 2 below. In Formula 2, a resistance R2 denotes a resistance in a direction in which the cooling water manifold 111 extends. A resistance R1 denotes a positive resistance from the center portion of the cooling water manifold 111 up to the entrance of the cooling water channel 8. A resistance R3 denotes a negative resistance from the center portion of the cooling water manifold 111 up to the entrance of the cooling water channel 8.

$$\text{Total Resistance } Rt = \text{Resistance } R1 + \text{Resistance } R2 + \text{Resistance } R3 \quad \text{Formula 2}$$

$$= \frac{L1}{\rho 1 \cdot S1} + \frac{L2}{\rho 2 \cdot S2} + \frac{L3}{\rho 3 \cdot S3}$$

As shown in FIG. 4, in the fuel cell described in PTL 1 described above, the resistance of the cooling water is increased by reducing a cross-sectional area S2 in the resistance R2, the cross-sectional area S2 being the area of a cross section perpendicular to the thickness direction of the polymer electrolyte membrane 1. Thus, the corrosion of the separator is suppressed in the fuel cell described in PTL 1.

However, if the cross-sectional area S2 in the resistance R2 is reduced too much, the pressure loss in the cooling water manifold increases and the distributivity of the cooling water from the cooling water manifold to the cooling water channels of the fuel cells deteriorates. Therefore, the fuel cell cannot be cooled adequately, and the cell performance may deteriorate.

In contrast, as shown in FIG. 5, according to the fuel cell stack 100 (fuel cell 50) of Embodiment 1, by forming the first channel forming portion 11 on the frame 3, a distance L1 in the resistance R1 and a distance L3 in the resistance R3 between the cells which short-circuit can be significantly made longer than those of the fuel cell described in PTL 1.

In addition, according to the fuel cell stack 100 (fuel cell 50) of Embodiment 1, by forming the projecting portion 11A on the frame 3, the cross-sectional area S2 in the resistance R2, the cross-sectional area S2 being the area of the cross section perpendicular to the thickness direction of the polymer electrolyte membrane 1, can be reduced as with the fuel cell described in PTL 1.

As above, according to the fuel cell stack 100 (fuel cell 50) of Embodiment 1, the resistances R1, R2, R3 can be increased, and as a result, the resistance of the cooling water can be significantly made higher than that of the fuel cell described in PTL 1 above. With this, the amount of corrosion current can be reduced significantly. Therefore, according to the fuel cell stack 100 (fuel cell 50) of Embodiment 1, the corrosion of the first separator 4A and the second separator 4C can be further suppressed.

Here, in the conventional configuration, the value of R1 plus R3 is about 2.5 to 5 times the value of R2. According to the configuration of the present application, by adjusting L1, L3, S1, and S3, the value of R1 plus R3 can be set to 20 to 100 times the value of R2. It is especially preferable that the sum of the resistances R1 and R3 be set to 25 to 50 times the resistance R2. For example, in a case where L1 is 0.5 cm, S1 is 0.1 cm times 0.5 cm, that is, 0.05 $cm^2$, L2 is 9 cm, S2 is 1.5 $cm^2$, L1 equals L3, and S1 equals S3 in the conventional configuration, L1 can be set to 1.0 cm and S1 can be set to 0.1×0.1 cm in the configuration of the present application. Therefore, the sum of the resistances R1, R2, and R3 in the configuration of the present application can be set to about eight times the resistance of the conventional configuration.

On this account, according to the fuel cell stack 100 (fuel cell 50) of Embodiment 1, the corrosion of the first separator 4A and the second separator 4C can be further suppressed while suppressing the decrease in distributivity of the cooling water. Then, according to the fuel cell stack 100 (fuel cell 50) of Embodiment 1 configured as above, since the distance from the wall surface constituting the first cooling water manifold hole or the second cooling water manifold hole, such as the cooling water supply manifold hole 41, up to the seal line at which the gasket 9 is provided can be reduced, the separator can be reduced in size. Therefore, the fuel cell stack 100 (fuel cell 50) can be reduced in size.

If the same endurance time is assured, a control value of the electric conductivity of the cooling water in the fuel cell stack 100 (fuel cell 50) of Embodiment 1 can be relaxed as compared to the conventional fuel cell stack 100 (fuel cell 50). Therefore, the amount of ion-exchange resin used to maintain low electric conductivity in the fuel cell system can be reduced.

In Embodiment 1, the first channel forming portion 11 is constituted by the first convex portion 11B and the second convex portion 11C. However, the present embodiment is not limited to this. The first channel forming portion 11 may be constituted only by the first convex portion 11B or only by the second convex portion 11C.

In Embodiment 1, each of the first convex portion 11B and the second convex portion 11C is formed in a ring shape when viewed from the thickness direction of the frame 3. However, the present embodiment is not limited to this. Each of the first convex portion 11B and the second convex portion 11C may be formed in any shape as long as each of the first convex portion 11B and the second convex portion 11C is formed so as to be opposed to at least a part of the end surface (wall surface) constituting the first cooling water manifold hole and the second cooling water manifold hole when viewed from the thickness direction of the frame 3. For example, each of the first convex portion 11B and the second convex portion 11C may be formed in a circular-arc shape or a linear shape when viewed from the thickness direction of the frame 3.

In Embodiment 1, the cooling water channel 8 is formed on the first separator 4A. However, the present embodiment is not limited to this. The cooling water channel 8 may be formed on the second separator 4C, or the cooling water channel 8 may be formed on each of the first separator 4A and the second separator 4C.

Further, in Embodiment 1, the end separators 21 are provided. However, the present embodiment is not limited to this. The end separators 21 may not be provided.

Modification Example 1

Next, the fuel cell stack (fuel cell) of Modification Example 1 of Embodiment 1 will be explained.

Figure 6:
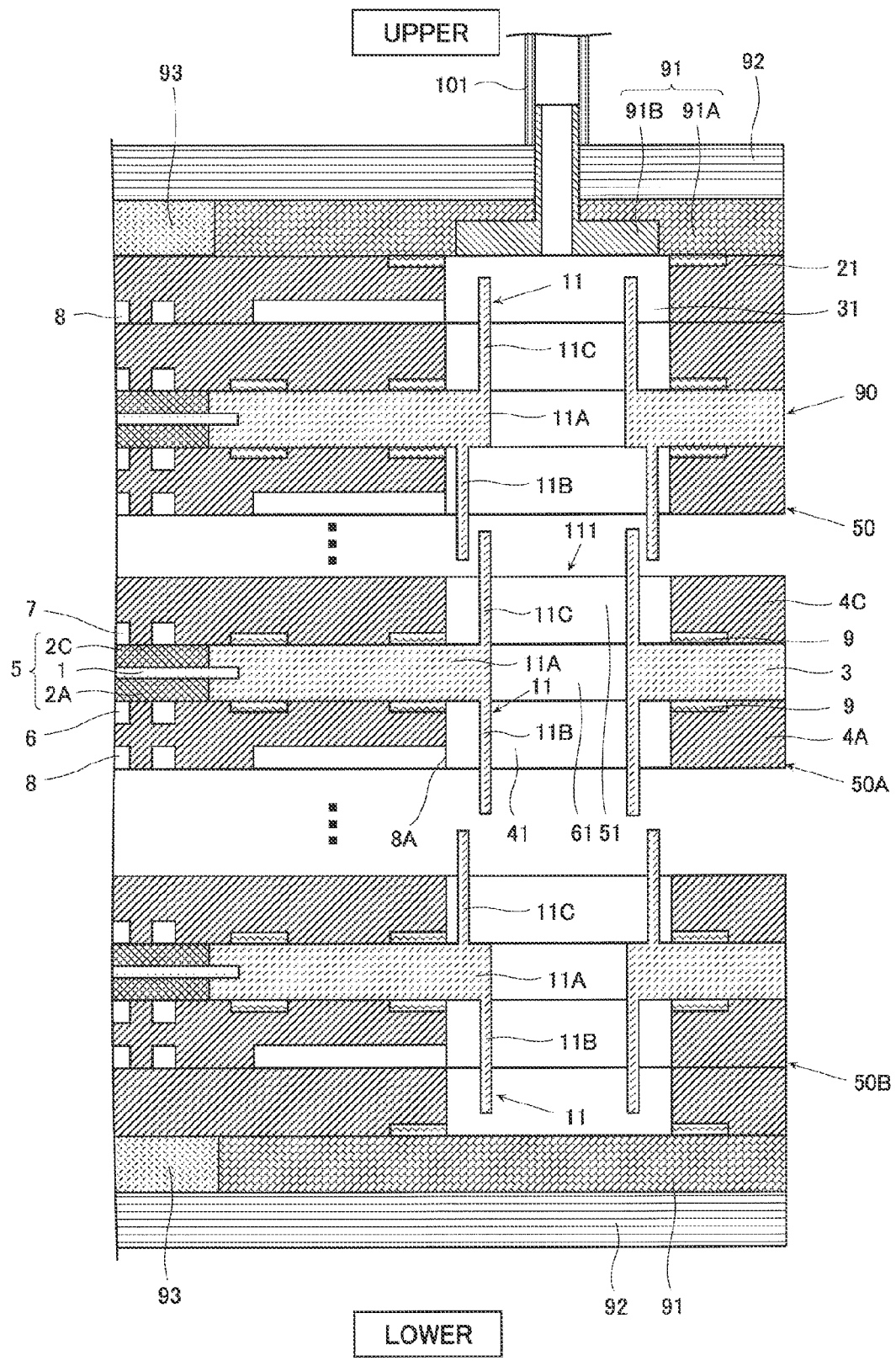
FIG. 6 is a cross-sectional view schematically showing the schematic configuration of the fuel cell stack of Modification Example 1 of Embodiment 1.

FIG. 6 is a cross-sectional view schematically showing the schematic configuration of the fuel cell stack of Modification Example 1 of Embodiment 1. In FIG. 6, a part of the fuel cell stack is omitted, and the upper-lower direction of the fuel cell stack is shown as the upper-lower direction of the drawing.

As shown in FIG. 6, the fuel cell stack 100 of Modification Example 1 is the same in basic configuration as the fuel cell stack 100 according to Embodiment 1 but is different from the fuel cell stack 100 according to Embodiment 1 regarding the configuration of the fuel cell 50. Specifically, each of the fuel cells 50 located on the upper side of a center, which is a center in the stack direction of the fuel cells, of the cell stack body 90 (located upstream of a center, which is a center in a direction in which the cooling water manifold 111 extends, of the cooling water manifold 111) is configured in the same manner as the fuel cell 50 of the fuel cell stack 100 according to Embodiment 1. In contrast, each of a fuel cell 50A located at the center of the cell stack body 90 (at the center of the cooling water manifold 111) and fuel cells 50B located on the lower side of the center of the cell stack body 90 (located downstream of the center of the cooling water manifold 111) is different in configuration from the fuel cell 50 of the fuel cell stack 100 according to Embodiment 1.

The fuel cell 50A is the same in basic configuration as the fuel cell 50 but is different from the fuel cell 50 in that the first convex portion 11B is provided so as to overlap the second convex portion 11C when viewed from the thickness direction of the frame 3. The fuel cell 50B is the same in basic configuration as the fuel cell 50 but is different from the fuel cell 50 in that the second convex portion 11C is provided so as to be closer to the opening of the cooling water supply manifold hole 61 (cooling water discharge manifold hole 62) than the first convex portion 11B when viewed from the thickness direction of the frame 3.

The fuel cell stack 100 (the fuel cell 50, the fuel cell 50A, or the fuel cell 50B) of Modification Example 1 configured as above can also obtain the same operational advantages as the fuel cell stack 100 (fuel cell 50) according to Embodiment 1.

In Modification Example 1, the fuel cell 50A is provided with the first convex portion 11B and the second convex portion 11C. However, the present example is not limited to this. For example, the fuel cell 50A may be provided with one of the first convex portion 11B and the second convex portion 11C, or the fuel cell 50A may not be provided with the first convex portion 11B and the second convex portion 11C.

Embodiment 2

The fuel cell according to Embodiment 2 of the present invention is configured such that at least one of a pair of insulating members is provided with a second channel forming portion located in at least one of the first cooling water manifold hole and the second cooling water manifold hole when viewed from the thickness direction of the electrolyte layer and provided so as to be opposed to at least a part of the end surface constituting the first cooling water manifold hole and the second cooling water manifold hole.

Configuration of Fuel Cell Stack

Figure 7:
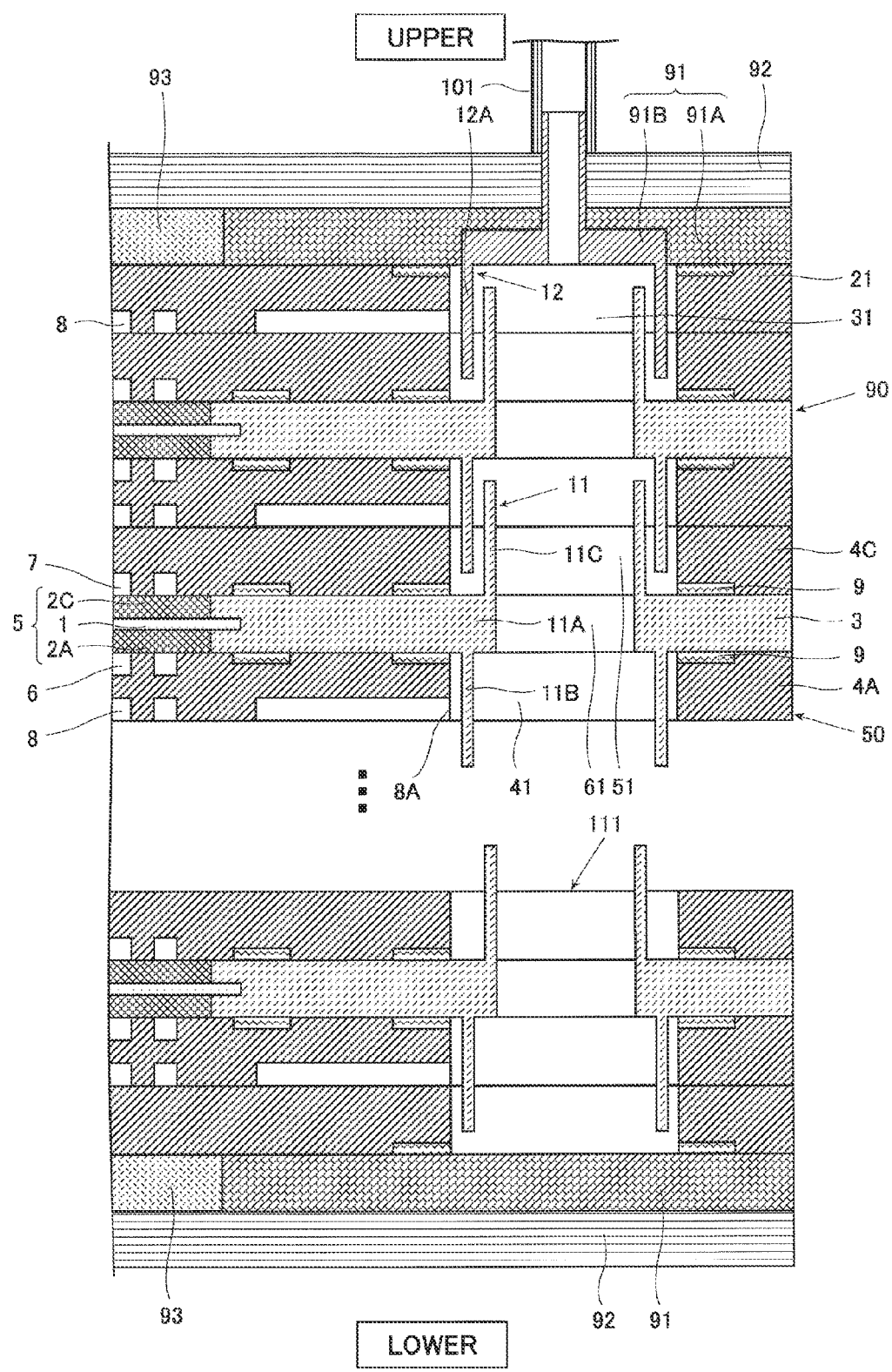
FIG. 7 is a cross-sectional view schematically showing the schematic configuration of the fuel cell stack according to Embodiment 2 of the present invention.

FIG. 7 is a cross-sectional view schematically showing the schematic configuration of the fuel cell stack according to Embodiment 2 of the present invention. In FIG. 7, a part of the fuel cell stack is omitted, and the upper-lower direction of the fuel cell stack is shown as the upper-lower direction of the drawing.

As shown in FIG. 7, the fuel cell stack 100 according to Embodiment 2 of the present invention is the same in basic configuration as the fuel cell stack 100 according to Embodiment 1 but is different from the fuel cell stack 100 according to Embodiment 1 in that the insulating member 91 is provided with a second channel forming portion 12. Specifically, the second channel forming portion 12 is located in the cooling water supply manifold hole 31 or cooling water discharge manifold hole (not shown in FIG. 7) of the end separator 21 when viewed from the thickness direction of the polymer electrolyte membrane 1 and is provided so as to be opposed to at least a part of the end surface (wall surface) constituting the cooling water supply manifold hole 31 or the cooling water discharge manifold hole.

Moreover, the second channel forming portion 12 is located in at least one of the first cooling water manifold holes, such as the cooling water supply manifold hole 41, and the second cooling water manifold holes, such as the cooling water supply manifold hole 51, (in FIG. 7, the cooling water supply manifold hole 51) when viewed from the thickness direction of the polymer electrolyte membrane 1 and is provided so as to be opposed to at least a part of the end surface (wall surface) constituting the first cooling water manifold hole or the second cooling water manifold hole.

The second channel forming portion 12 is constituted by a third convex portion 12A provided at the connecting member 91B of the insulating member 91. The third convex portion 12A is formed so as to extend from the connecting member 91B in the thickness direction of the polymer electrolyte membrane 1. In Embodiment 2, it is preferable that the third convex portion 12A be formed so as to be opposed to the entrance of the cooling water channel 8 formed on the end separator 21 when viewed from the thickness direction of the polymer electrolyte membrane 1. It is preferable that in a case where the fuel cell stack 100 is not provided with the end separator 21, the third convex portion 12A be formed so as to be opposed to the entrance of the cooling water channel 8 formed on the first separator 4A or the second separator 4C.

With this, the cooling water flows from the cooling water manifold 111 along the third convex portion 12A to be supplied to the entrance 8A of the cooling water channel 8. Therefore, the height-direction corrosion of the end surface (wall surface) constituting the cooling water supply manifold hole 31 can be further suppressed.

To further suppress the circumferential-direction corrosion of the end surface (wall surface) constituting the cooling water supply manifold hole 31 (or the cooling water discharge manifold hole formed on the end separator 21 and not shown in FIG. 7), it is preferable that the third convex portion 12A be formed in a ring shape when viewed from the thickness direction of the polymer electrolyte membrane 1. By forming the third convex portion 12A in a ring shape when viewed from the thickness direction of the polymer electrolyte membrane 1, the third convex portion 12A can further suppress the circumferential-direction corrosion of the end surface (wall surface) constituting the first cooling water manifold hole or the second cooling water manifold hole in a case where the fuel cell stack 100 is not provided with the end separator 21.

Further, it is preferable that when viewed from the direction perpendicular to the thickness direction of the frame 3, an extending-direction length of the third convex portion 12A be longer than a thickness-direction length of the end separator 21 and shorter than the sum of the thickness-direction lengths of the end separator 21 and the first separator 4A or the sum of the thickness-direction lengths of the end separator 21 and the second separator 4C. With this, the height-direction corrosion of the end surface (wall surface) constituting the cooling water supply manifold hole 31 or cooling water discharge manifold hole formed on the end separator 21 can be further suppressed.

In a case where the fuel cell stack 100 is not provided with the end separator 21, it is preferable that when viewed from a direction perpendicular to the thickness direction of the polymer electrolyte membrane 1, the extending-direction length of the third convex portion 12A be longer than the thickness-direction length of at least one of the first separator 4A and the second separator 4C and shorter than the sum of the thickness-direction lengths of the first separator 4A and the second separator 4C. With this, the height-direction corrosion of the end surface (wall surface) constituting the cooling water supply manifold hole 41 (cooling water supply manifold hole 51) or the cooling water discharge manifold hole 42 (cooling water discharge manifold hole 52) can be further suppressed.

The fuel cell stack 100 (fuel cell 50) according to Embodiment 2 configured as above can also obtain the same operational advantages as the fuel cell stack 100 (fuel cell 50) according to Embodiment 1. Moreover, in the fuel cell stack 100 according to Embodiment 2, the insulating member 91 is provided with the second channel forming portion 12. Therefore, the corrosion of the wall surface constituting the cooling water manifold hole, such as the cooling water supply manifold hole 31 formed on the end separator 21, can be further suppressed.

In Embodiment 2, the second channel forming portion 12 is provided at the connecting member 91B of the insulating member 91. However, the present embodiment is not limited to this. The second channel forming portion 12 may be provided at the peripheral member 91A of the insulating member 91.

Modification Example 1

Next, the fuel cell stack (fuel cell) of Modification Example 1 of Embodiment 2 will be explained.

Figure 8:
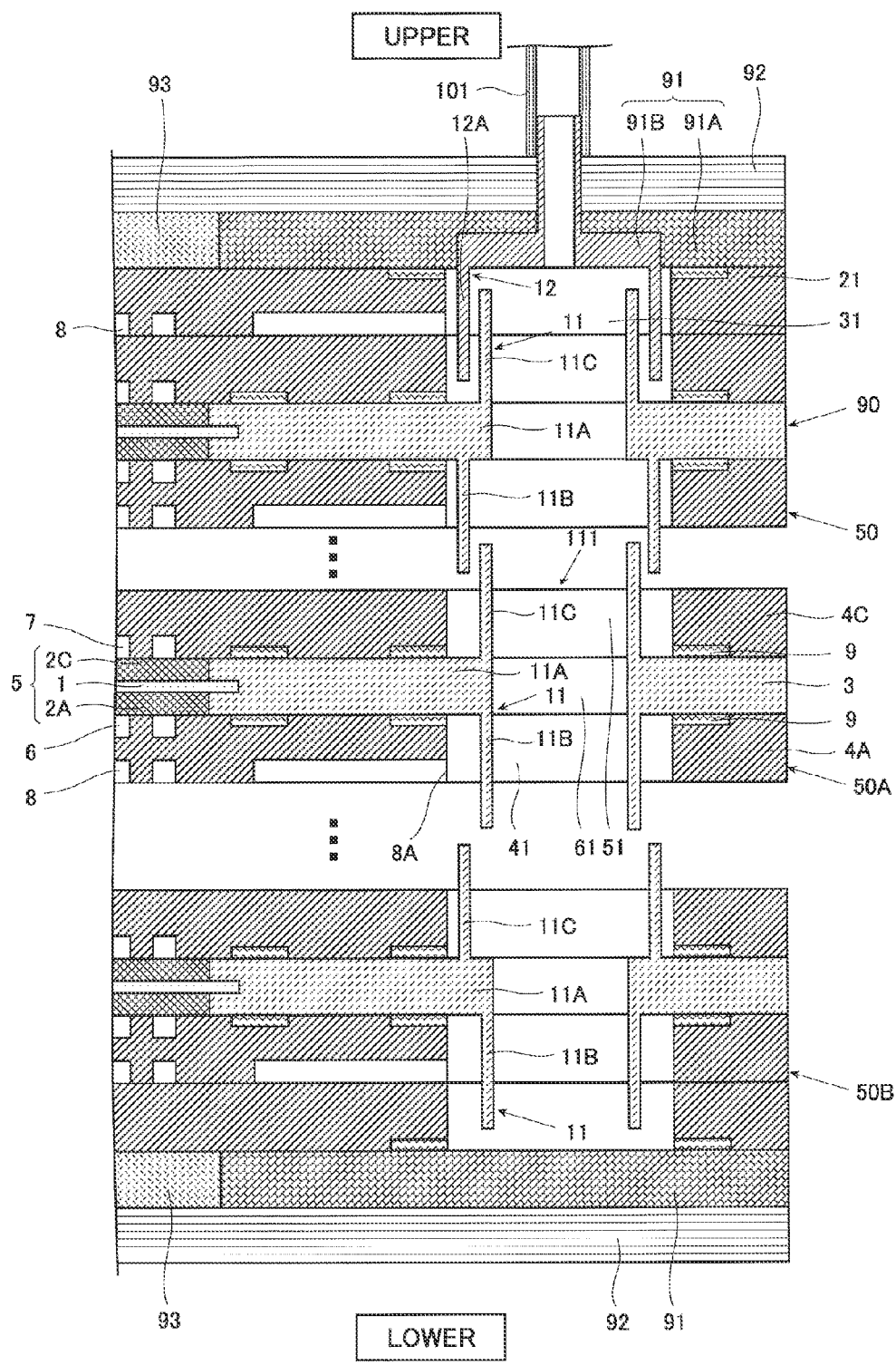
FIG. 8 is a cross-sectional view schematically showing the schematic configuration of the fuel cell stack of Modification Example 1 of Embodiment 2.

FIG. 8 is a cross-sectional view schematically showing the schematic configuration of the fuel cell stack of Modification Example 1 of Embodiment 2. In FIG. 8, a part of the fuel cell stack is omitted, and the upper-lower direction of the fuel cell stack is shown as the upper-lower direction of the drawing.

As shown in FIG. 8, the fuel cell stack 100 of Modification Example 1 is the same in basic configuration as the fuel cell stack 100 according to Embodiment 2 but is different from the fuel cell stack 100 according to Embodiment 2 regarding the configuration of the fuel cell 50. Specifically, the fuel cell 50 herein is configured in the same manner as that of Modification Example 1 of Embodiment 1 (see FIG. 6).

To be specific, each of the fuel cells 50 located on the upper side of the center, which is a center in the stack direction of the fuel cells, of the cell stack body 90 (located upstream of the center, which is a center in a direction in which the cooling water manifold 111 extends, of the cooling water manifold 111) is configured in the same manner as the fuel cell 50 of the fuel cell stack 100 according to Embodiment 1. Moreover, the fuel cell 50A located at the center of the cell stack body 90 (at the center of the cooling water manifold 111) is configured in the same manner as the fuel cell 50A of Modification Example 1 of Embodiment 1. Further, each of the fuel cells 50B located on the lower side of the center of the cell stack body 90 (located downstream of the center of the cooling water manifold 111) is configured in the same manner as the fuel cell 50B of Modification Example 1 of Embodiment 1.

The fuel cell stack 100 (the fuel cell 50, the fuel cell 50A, or the fuel cell 50B) of Modification Example 1 configured as above can also obtain the same operational advantages as the fuel cell stack 100 (fuel cell 50) according to Embodiment 2.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

Since the fuel cell and fuel cell stack of the present invention can suppress the corrosion of the wall surface of the cooling water manifold hole of the separator, they are useful in the field of fuel cells.

| Reference Signs List | |
|---|---|
| 1 | polymer electrolyte membrane |
| 2A | electrode |
| 2C | electrode |
| 3 | frame |
| 3A | opening |
| 4A | first separator |
| 4C | second separator |
| 5 | MEA |
| 6 | first reactant gas channel |
| 7 | second reactant gas channel |
| 8 | cooling water channel |
| 8A | entrance |
| 9 | gasket |
| 11 | first channel forming portion |
| 11A | projecting portion |
| 11B | first convex portion |
| 11C | second convex portion |
| 12 | second channel forming portion |
| 12A | third convex portion |
| 21 | end separator |
| 31 | cooling water supply manifold hole |
| 41 | cooling water supply manifold hole |
| 42 | cooling water discharge manifold hole |
| 43 | first reactant gas supply manifold hole |
| 44 | first reactant gas discharge manifold hole |
| 45 | second reactant gas supply manifold hole |
| 46 | second reactant gas discharge manifold hole |
| 50 | fuel cell |
| 50A | fuel cell |
| 50B | fuel cell |
| 51 | cooling water supply manifold hole |
| 52 | cooling water discharge manifold hole |
| 61 | cooling water supply manifold hole |
| 62 | cooling water discharge manifold hole |
| 63 | first reactant gas supply manifold hole |
| 64 | first reactant gas discharge manifold hole |
| 65 | second reactant gas supply manifold hole |
| 66 | second reactant gas discharge manifold hole |
| 90 | cell stack body |
| 91 | insulating member |

| Reference Signs List | |
|---|---|
| 91A | peripheral member |
| 91B | connecting member |
| 92 | end plate |
| 93 | current collector |
| 100 | fuel cell stack |
| 101 | pipe |
| 111 | cooling water manifold |

The invention claimed is:

1. A fuel cell comprising:
an electrolyte layer-electrode assembly including an electrolyte layer and a pair of electrodes respectively provided on main surfaces of the electrolyte layer;
a frame provided so as to sandwich a peripheral portion of the electrolyte layer;
a first separator having electrical conductivity, formed in a plate shape, and provided with a first cooling water manifold hole penetrating the first separator in a thickness direction of the first separator; and
a second separator having electrical conductivity, formed in a plate shape, and provided with a second cooling water manifold hole penetrating the second separator in a thickness direction of the second separator, wherein:
the electrolyte layer-electrode assembly and the frame are sandwiched between the first separator and the second separator;
the frame is provided with a third cooling water manifold hole penetrating the frame in a thickness direction of the frame and communicating with the first cooling water manifold hole and the second cooling water manifold hole;
a cooling water channel is formed on a main surface of at least one of the first separator and the second separator so as to communicate with at least one of the first cooling water manifold hole and the second cooling water manifold hole; and
a first channel forming portion is located in at least one of the first cooling water manifold hole and the second cooling water manifold hole when viewed from a thickness direction of the electrolyte layer and is provided so as to be opposed to and to face at least a part of an end surface constituting the first cooling water manifold hole or the second cooling water manifold hole so that the end surface obstructs flow of cooling water into the cooling water channel.

2. The fuel cell according to claim 1, wherein:
the third cooling water manifold hole of the frame is formed such that when viewed from the thickness direction of the electrolyte layer, an opening of the third cooling water manifold hole is smaller than an opening of each of the first cooling water manifold hole and the second cooling water manifold hole; and
the first channel forming portion is constituted by a first convex portion extending in the thickness direction of the frame toward the first separator.

3. The fuel cell according to claim 2, wherein the first convex portion is formed so as to be opposed to an entrance of the cooling water channel when viewed from a direction perpendicular to the thickness direction of the electrolyte layer.

4. The fuel cell according to claim 1, wherein the first convex portion is formed in a ring shape when viewed from the thickness direction of the electrolyte layer.

5. The fuel cell according to claim 1, wherein:
the third cooling water manifold hole of the frame is formed such that when viewed from the thickness direction of the electrolyte layer, an opening of the third cooling water manifold hole is smaller than an opening of each of the first cooling water manifold hole and the second cooling water manifold hole; and
the first channel forming portion is constituted by a first convex portion extending in the thickness direction of the frame toward the first separator and a second convex portion extending in the thickness direction of the frame toward the second separator.

6. The fuel cell according to claim 5, wherein the second convex portion is formed in a ring shape when viewed from the thickness direction of the electrolyte layer.

7. The fuel cell according to claim 5, wherein the first convex portion and the second convex portion are formed so as not to overlap each other when viewed from a direction perpendicular to the thickness direction of the electrolyte layer.

8. The fuel cell according to claim 5, wherein when viewed from a direction perpendicular to the thickness direction of the electrolyte layer, an extending-direction length of at least one of the first convex portion and the second convex portion is longer than a thickness-direction length of at least one of the first separator and the second separator and shorter than a sum of thickness-direction lengths of the first separator and the second separator.

9. The fuel cell according to claim 1, wherein the frame is made of an insulating material.

10. A fuel cell stack comprising:
a cell stack body formed by stacking a plurality of fuel cells according to claim 1; and
a pair of insulating members respectively provided on both stack-direction ends of the cell stack body.

11. The fuel cell stack according to claim 10, wherein at least one of the pair of insulating members is provided with a second channel forming portion located in at least one of the first cooling water manifold hole and the second cooling water manifold hole when viewed from the thickness direction of the electrolyte layer and provided so as to be opposed to at least a part of the end surface constituting the first cooling water manifold hole and the second cooling water manifold hole.

12. The fuel cell stack according to claim 11, wherein the second channel forming portion is constituted by a third convex portion extending from the insulating member in the thickness direction of the electrolyte layer.

13. The fuel cell stack according to claim 12, wherein the third convex portion is formed so as to be opposed to an entrance of the cooling water channel when viewed from a direction perpendicular to the thickness direction of the electrolyte layer.

14. The fuel cell stack according to claim 12, wherein the third convex portion is formed in a ring shape when viewed from the thickness direction of the electrolyte layer.

* * * * *